Figure 1:
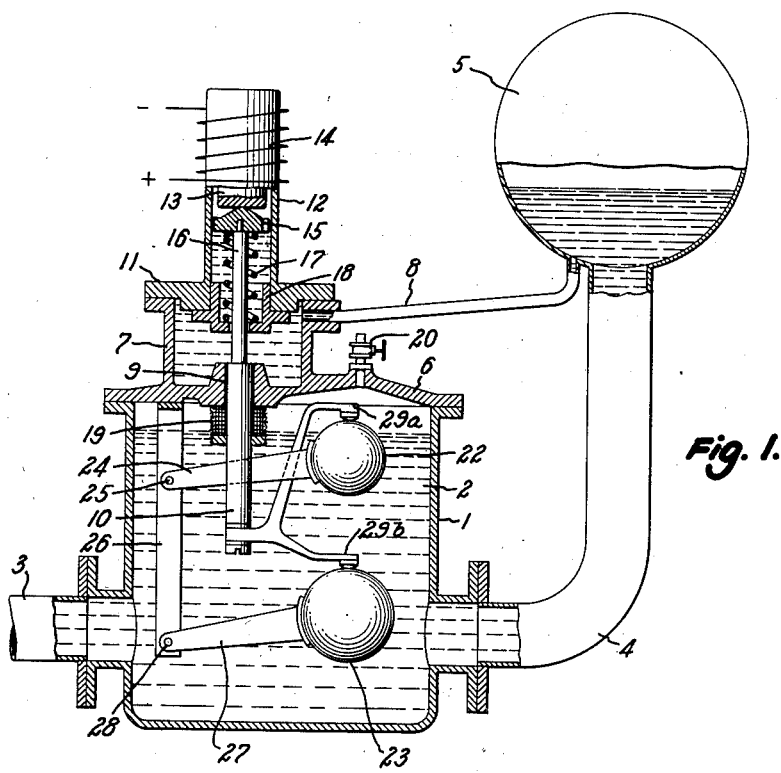

Alfred Bräm
Inventor

By Pierce Scheffler & Parker
Attorneys

Patented Nov. 4, 1952

2,616,443

UNITED STATES PATENT OFFICE 2,616,443

PROTECTIVE ARRANGEMENT FOR ELECTRICAL APPARATUS OPERATING IN AN INSULATING LIQUID

Alfred Bräm, Schlieren, near Zurich, Switzerland, assignor to Micafil A.-G., Zurich-Altstetten, Switzerland, a joint-stock company Application August 21, 1950, Serial No. 180,677
In Switzerland September 7, 1949

5 Claims. (Cl. 137—171)

1

This invention relates in general to protective arrangements for electrical apparatus of the general type adapted to operate immersed in an insulating liquid, and an electrical transformer having its winding immersed in a tank of insulating oil may be considered typical. Should a defect such as a short circuit occur in the transformer windings, gas will be generated within the oil and it is known to utilize this phenomenon both for raising an alarm and switching off the electrical apparatus to prevent further damage thereto. The device responsive to formation of the gas is usually one or more floats operating in the insulating liquid. These floats maintain a predetermined position in the liquid in the absence of gas but change their position as soon as the gas begins to generate, and the change in float position is used to control switches of the protective equipment. In one specific float arangement now used, two floats are immersed in the liquid one over the other. The upper one which reacts to generation of gas slowly at a low rate is employed to set off an alarm, and the lower one having a greater buoyancy than the upper one and which reacts to a sudden generation of gas at a much higher rate is employed to actuate relays or other like devices for switching off the electrical apparatus.

Periodic testing of the protective equipment is highly desirable to make certain that the same will operate when the need arises. One known way for testing the equipment is to pump compressed air into the tank containing the insulating liquid and floats. Assuming a two float arrangement as described above, blowing in of the compressed air at a slow rate will cause the upper float to shift its position in the same manner as would be the case were gas to be generated in the liquid at a slow rate. Similarly, blowing in the compressed air at a sudden fast rate has the same effect upon the lower float as would a sudden fast generation of gas in the liquid.

Another arrangement that has been adopted for testing the protective equipment includes a remotely controlled electro-magnetically actuated pusher arm that engages the floats and moves them to the positions which they would normally assume in the event of gas generation.

Should it happen that the floats already be in their shifted position due to the accumulation of gas in the float chamber at the time a test is desired, the last mentioned type of test equipment will not be satisfactory because it is then

2 impossible to determine whether the floats are able to satisfactorily execute the oscillatory motion which is necessary upon formation of gas. Hence a verification of the operability of the protective equipment satisfactory in every respect cannot be obtained unless the float chamber is opened to vent any gas which may have accumulated therein.

The object of the present invention is to provide for opening the float chamber from a remote location, i. e. at the test station, just prior to testing of the protective equipment.

A more specific object is to provide a remotely actuatable vent valve on the tank containing the float or floats by which the float chamber can first be degassed and then tested.

Still another specific object is to provide a degassing valve for the float tank in which the valve member movable to open and close the valve also functions to depress the floats to determine the operability of the protective equipment.

Figure 2:
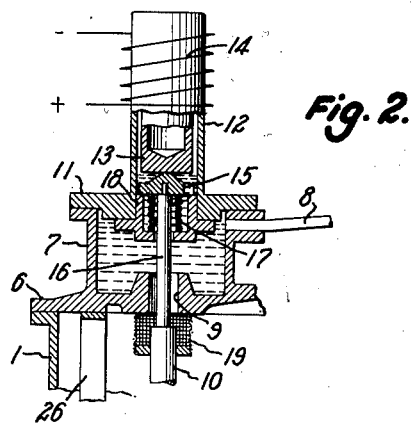

The foregoing as well as other objects and advantages inherent in the invention will become more apparent from the following detailed description of a preferred embodiment of the invention when considered with the accompanying drawings in which Fig. 1 is a view in vertical section through the improved float tank and vent valve with the latter in closed position, and Fig. 2 is a similar fragmentary view showing the valve in open position.

With reference now to the drawings, numeral 1 designates a tank chamber adapted to be nearly filled with the insulating liquid 2 in which the electrical apparatus to be protected is immersed. In the particular construction illustrated, the electrical apparatus is housed within a separate tank (not illustrated) and the latter is connected with tank 1 by means of a duct 3 which joins tank 1 at the lower portion thereof. On the side of tank 1 opposite duct 3 another duct 4 leads outward and up from the tank 1 to an expansion vessel 5 and the liquid level in vessel 5 will of course stand above the level of the liquid in the main tank containing the electrical apparatus to be protected.

The top of tank chamber 1 is closed by a lid 6 having upstanding thereon another but smaller tank chamber 7 communicating with the expansion vessel 5 by means of a duct 8 leading from the upper end of chamber 7. Chamber 7 also is adapted to communicate with the lower tank chamber 1 through a valve bore 9 embodied in the lid 6 when the valve piston 10 is moved downwardly from the position shown in Fig. 1 to the position shown in Fig. 2.

The top of tank chamber 7 is closed by a lid 11 which includes an upstanding hollow cylinder 12 that contains the plunger element 13 of a solenoid, the solenoid winding being indicated at 14 and adapted to be energized through controls under the supervision of the operator located remotely therefrom at the test station. The solenoid plunger 13 abuts the upper end of a valve guide 15 secured atop a rod extension 16 that projects upwardly from valve piston 10. A coiled spring 17 surrounding rod 16 and held in compression between valve guide 15 and the upper face of an apertured guide plate 18 secured to lid 11 and through which rod 16 passes is used to bias the valve piston 10 upwardly to the position shown in Fig. 1 wherein the valve is closed. Rod 16 is of course smaller in cross-section than valve piston 10 to the end that when the piston has been lowered to the position shown in Fig. 2, the upper and lower tank chambers 1 and 7 will be in comunication with one another.

As indicated in the dawing, the valve bore 9 preferably does not make a snug sliding fit with piston 10 but on the contrary is purposely made somewhat larger than the piston so as to enable the piston to be operated with a minimal expenditure of force. The capillary attraction effect of the liquid in the free space between valve bore 9 and piston 10 provides the necessary packing for the valve preventing escape of any gas upwardly from chamber 1 to chamber 7 when the valve is closed. Moreover, due to the temperature difference in the two ducts 4 and 8, there rests on the column made lighter by the gas the heavier insulating liquid, so that the surplus weight of this column together with the above-mentioned capillary attraction effect prevents any gas accumulated in chamber 1 from escaping through the closed valve, this despite the fact that the liquid column above the gas is smaller.

Depending from the lid 6 and surrounding the lower end of valve bore 9 is a cylindrical filter screen 19 through which valve piston 10 passes. The screen 19 is included to hold back impurities. Lid 6 may also include a hand operated cock 20 through which gas specimens may be drawn off for analysis.

The upper and lower floats previously mentioned and whose change in position due to accumulation of gas pressure in the upper part of chamber 1 is used respectively to set off an alarm and disconnect the electrical apparatus are shown as hollow spheres 22, 23. The upper float 22 is carried at the free end of an arm 24, the oposite end of which is pivotally connected at 25 to a bracket 26 which depends from the tank lid 6. The lower float 23, larger than float 22, is similarly mounted at the free end of arm 27 having its opposite end pivotally connected at 28 to bracket 26.

Mercury switches (not shown) are associated with both floats in such manner that as the floats swing downwardly in the liquid 2 on their supporting arms from the normal to the gas actuated position, the switch contacts will close, or if desired open, to thus initiate a train of events culminating either in an alarm or switch-out of the electrical apparatus dependent upon which of the two floats is actuated.

In order to oscillate the floats on their support pivots between their upper and lower positions for the purpose of testing their freedom for movement as well as the operability of the mersury switches and other related components of the complete protective equipment, use is made of a dual armed member secured to the lower end of valve piston 10. One of the arms 29a is adapted to depress the upper float 22 as valve piston 10 descends to open the valve, and the other arm 29b similarly depresses the lower float 23. By thus incorporating the float actuating members with the valve piston, the latter can then serve two functions. On the other hand, the valve mechanism could be divorced from the mechanism used to test the operability of the floats if desired, each of course being controllable remotely from the test station.

Operation of the device is as follows. Upon energization of solenoid winding 14, plunger 13 descends thus shifting valve piston 10 to the position shown in Fig. 2. Any gas that has accumulated in the upper portion of chamber 1 is thus free to rise through valve bore 9 into the upper chamber 7 and pass outwardly from the latter through duct 8 into the expansion vessel 5. After degassing the lower chamber 1, solenoid winding 14 is deenergized for a brief time which permits valve piston 10 to ascend into and close off the valve bore 9. As valve piston 10 rises, the floats 22, 23 are likewise freed to ascend to their highest position. The solenoid winding 14 is then again energized this time for the specific purpose of actuating the floats 22, 23 in simulation of an actual protective action thereby enabling the operator to test the fitness of the complete protective equipment for response in the event of a fault in the electrical apparatus so protected.

In conclusion, it will be understood that while the illustrated embodiment may be preferred, various changes in the construction and arrangement of component parts may be made without departing from the spirit and scope of the invention as defined in the appended claims. Thus for example, the solenoid operated vent valve could be replaced with one actuated by a pneumatic or hydraulic motor, all of course capable of being controlled from the remotely located testing station. Moreover, in lieu of a motor type of valve control, the vent valve could be actuated mechanically from the remote position through a direct chain pull, lever mechanism or wheel transmission with a handwheel or the like.

I claim:

1. In a protective arrangement for electrical apparatus adapted to operate in an insulating liquid and which includes a chamber containing said liquid and a float in said liquid, said float being actuated in response to formation of gas in the liquid, the improvement constituted by a valve cooperative with and actuatable remotely from said chamber for venting gas therefrom said float being movable independently of said valve, and means controlled by said valve and engageable with said float for actuating said float simultaneously with actuation of said valve.

2. A protective arrangement as defined in claim 1 wherein said valve is actuated by a solenoid coupled thereto.

3. A protective arrangement as defined in claim 1 wherein said valve is constituted by a piston movable axially of a valve bore in a wall forming said chamber, said valve being open when said piston is free of said bore and closed when in the same.

4. In a protective arrangement for electrical apparatus adapted to operate in an insulating liquid, a lower main chamber containing said liquid, an auxiliary chamber also containing said liquid disposed above said main chamber and separated therefrom by a wall, an expansion vessel disposed at a level above said auxiliary chamber, conduits extending from said expansion vessel respectively to said main and auxiliary chambers, a float in the liquid in said main chamber, said float being actuated in response to formation of gas in the liquid, a valve bore extending through said wall between said chambers, and a remotely actuated valve piston operating in said bore, said chambers being placed in communication with one another when said piston is out of said bore and sealed off from each other when said piston is in said bore said float being movable independently of said valve piston, and said piston including a member engageable with said float for actuating said float simultaneously with actuation of said piston in the valve opening direction only.

5. A protective arrangement as defined in claim 4 wherein said main chamber contains a second float in said liquid, and the said member engageable with said float is constituted by a dual armed member adapted to depress said floats upon movement of the piston to the open position of the valve.

ALFRED BRÄM.

REFERENCES CITED

The following references are of record in the file of this patent:

UNITED STATES PATENTS

| Number | Name | Date |
|---|---|---|
| 154,513 | Meyers | Aug. 25, 1874 |
| 650,647 | Lowe | May 29, 1900 |
| 1,238,608 | Whitton | Aug. 28, 1917 |

FOREIGN PATENTS

| Number | Country | Date |
|---|---|---|
| 66 | Great Britain | Jan. 1, 1895 |